US006935221B2

(12) United States Patent
Narney, II et al.

(10) Patent No.: US 6,935,221 B2
(45) Date of Patent: Aug. 30, 2005

(54) METHOD FOR MANUFACTURING AN ALUMINUM DIE CAST PISTON FOR RECIPROCATING COMPRESSORS

(75) Inventors: John Kenneth Narney, II, Bristol, VA (US); David Turner Monk, Bristol, VA (US); Scott Garrison Hix, Bristol, VA (US); Benjamin Alan Majerus, Bristol, VA (US)

(73) Assignee: Bristol Compressors, Inc., Bristol, VA (US)

( * ) Notice: Subject to any disclaimer, the term of this patent is extended or adjusted under 35 U.S.C. 154(b) by 104 days.

(21) Appl. No.: 10/397,388

(22) Filed: Mar. 26, 2003

(65) Prior Publication Data

US 2004/0187678 A1 Sep. 30, 2004

(51) Int. Cl.[7] .................................................. F16J 1/14

(52) U.S. Cl. ........................ 92/187; 92/216; 29/888.04; 29/888.05

(58) Field of Search ................ 92/187, 216; 29/888.04, 29/888.05

(56) References Cited

U.S. PATENT DOCUMENTS

| | | | | |
|---|---|---|---|---|
| 1,835,863 A | * 12/1931 | Greve | | 29/888.04 |
| 2,438,585 A | * 3/1948 | Stuckert | | 29/888.04 |
| 3,010,186 A | * 11/1961 | Townhill | | 29/888.04 |
| 4,532,686 A | 8/1985 | Berchem | | |
| 5,014,658 A | 5/1991 | Hara et al. | | |
| 5,084,964 A | 2/1992 | Cyphers | | |
| 5,150,517 A | 9/1992 | Martins Leites et al. | | |
| 5,542,341 A | 8/1996 | Monk et al. | | |
| 5,630,353 A | 5/1997 | Mittlefehldt et al. | | |
| 5,913,960 A | 6/1999 | Fletcher-Jones | | |
| 5,960,542 A | 10/1999 | Umemura et al. | | |
| 6,053,081 A | 4/2000 | Kimura et al. | | |
| 6,152,016 A | 11/2000 | Bahr et al. | | |
| 6,453,555 B1 | 9/2002 | Kato et al. | | |

FOREIGN PATENT DOCUMENTS

| | | |
|---|---|---|
| EP | 1 126 168 A2 | 8/2001 |
| JP | 2001-65452 | 3/2001 |
| JP | 2001-232454 | 8/2001 |

* cited by examiner

*Primary Examiner*—Edward K. Look
*Assistant Examiner*—Igor Kershteyn
(74) *Attorney, Agent, or Firm*—McNees Wallace & Nurick LLC

(57) ABSTRACT

A die cast aluminum piston for a reciprocating compressor. The piston is cast with no coring and thus includes no aperture in the as-cast piston for a wrist pin. The aperture for the wrist pin is subsequently formed in the wrist pin in a preselected location after casting. The wrist pin is formed of a preselected diameter. Because the wrist pin can be placed in a preselected location with a preselected diameter, the same cast piston design can be used in a plurality of applications by varying the location of the aperture or the size of the aperture, or both.

9 Claims, 2 Drawing Sheets

METHOD FOR MANUFACTURING AN ALUMINUM DIE CAST PISTON FOR RECIPROCATING COMPRESSORS

FIELD OF THE INVENTION

The present invention is directed to an aluminum die cast piston for use with a reciprocating compressor.

BACKGROUND OF THE INVENTION

A reciprocating compressor operates to compress a refrigerant fluid by use of a piston operating in a cylinder. The reciprocating motion of the piston in the cylinder compresses the refrigerant. The reciprocating motion of the piston is due to a crankshaft and a rod, which converts the rotary motion of an electric motor to reciprocating motion. The piston is coupled to the crankshaft by a connecting rod. The connecting rod is attached to the piston by a piston pin or wrist pin, which is inserted into the piston. Activation of the electric motor causes the crankshaft to rotate, which in turn moves the connecting rod and piston as the crankshaft rotates.

In hermitically scaled reciprocating compressors, pistons are light in weight, typically being made from an aluminum alloy. While a piston can be made by a variety of methods, such as forging, they are made significantly more economically by die casting. Die casting forces molten metal into a mold cavity under high pressure. The molten metal is poured into a shot chamber, and a plunger forces the molten metal into a die cavity. After the molten metal solidifies, the die is opened and the casting and excess metal are removed from the die. The advantages of die casting include dimensional tolerance accuracy, excellent surface finish and castings of high strength. The process also enables a high production rate. Thick sections should be avoided, as these sections require additional time to solidify, thereby adversely affecting the strength of the casting. Die casting also allows for accurate coring and casting of inserts. Of course, the casting design must be such that the mold cavity and cores allow the casting to be ejected. Currently, the piston castings include coring which defines the geometry of the castings, including the size and location of a wrist pin or piston pin.

The coring of the die casting to locate a wrist pin eliminates subsequent manufacturing operations. However, the aperture produced by the coring creates other problems that are desirable to overcome. First, the location of the coring produces a piston in which the wrist pin aperture is in a fixed location. Thus, in order to change the location of the wrist pin aperture to vary the stroke of the piston, it is necessary to produce different castings with a core located at a different position along the length of the piston. It would be desirable to produce a single casting in which the wrist pin can be located at a varying position along the length of the piston in order to produce a desired piston stroke rather than produce a series of such castings with varying wrist pin locations.

Additionally, in existing die castings, the core used in the casting is about 0.030 inches smaller than the finished diameter. This produces an aperture at diametrally opposed locations along the diameter of the casting through its thickness. Of course, this reduces the amount of molten material that must be provided to the casting. The cooling rate and the injection pressure can be used to some extent to regulate surface hardness, which is also affected by entrapped gases and voids, forming porosity. In the region adjacent the core, the molten metal solidifies quickly, as the core acts to remove heat from the casting thereby speeding the cooling in this region. It is difficult to provide feed metal to this portion of the casting due to flow restrictions created by the cores, so that as solidification continues, there is no mechanism to feed this portion of the casting to totally account for shrinkage due to solidification. The result is that the solidified metal at the surface of the part has high strength and quality due to rapid cooling. However, a few thousands of an inch (mils) away from core, 0.030–0.060 inches, there are voids and porosity due to the solidification shrinkage. After the removal of the core from the casting, the aperture is exposed. If the aperture requires machining, a sufficient amount of sound metal must be left to prevent exposure of the voids and porosity. Machining too far into the skin of the piston can expose porosities, which are undesirable in this bearing surface and can eventually lead to premature bearing failure.

What is needed is a method of producing the castings for pistons cheaply while allowing placement of the wrist pin aperture to be varied, so that the same piston castings may be used in compressors with a different strokes. Additionally, the casting should be solidified so that the walls of the piston are fed with molten metal and are not the last portion of the piston to freeze, thereby minimizing casting defects due to void formation and porosity in the piston wall which could be exposed during the machining of the wrist pin bore.

SUMMARY OF THE INVENTION

The present invention is an aluminum die cast piston for a reciprocating compressor that is cast to near net shape without coring used to produce a wrist pin aperture. As used herein, the term aluminum includes both aluminum and aluminum alloys that are typically used for casting. The composition of the aluminum is not critical, as both the composition and the solidification rate can be varied to control the mechanical properties and hardness of the piston. The piston comprises a head at a first end and a cylindrical body extending away from the head to a second end. The piston body generally has a preselected outer diameter, a preselected inner geometry and a preselected thickness so as to form a thin shell. The head and the inner geometry of the cylindrical body define a cavity opening to the second end on the lower side of the head. The cavity itself may include a specific geometry to accommodate a connecting rod, and this geometry can affect the thickness of the shell. The cast piston of the present invention is further characterized by an absence of wrist pin apertures formed by cores extending through the shell. Within the cavity, a first pair of parallel walls extend as chords across the inner geometry of the shell. A second pair of parallel walls substantially at about 90° to the first pair of walls extend as chords across the inner geometry of the shell. One pair of walls forms a longer chord than the other pair of walls so that the first and second pair of walls form a substantially rectangular geometry within the cavity. The rectangular geometry accepts an end of the connecting rod having a similar geometry, as will become clear.

The cast piston of the present invention is capable of receiving an aperture extending diametrally across and through the outer diameter of the cast piston at a preselected location between the first end and the second end. The aperture should have a preselected diameter corresponding to an outer diameter of a pin. The aperture is formed in the casting by any suitable machining operation.

An advantage of the present invention is that the wrist pin can be placed into the piston casting at any axial location between the first end and the second end. The same piston casting design can therefore be used for different applications. Furthermore, because the mold does not include a core for the wrist pin aperture to impede the molten metal flow, intensification pressure may be successfully applied, allowing an advancing solidification interface to be fed from thicker sections of the casting and reduce casting defects such as voids and porosity.

Another advantage of the present invention is that the piston can be cast using a less expensive, less complex die, since the core for the wrist pin, as well as securing the core in the die as pressurized molten metal is forced into the die are eliminated.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
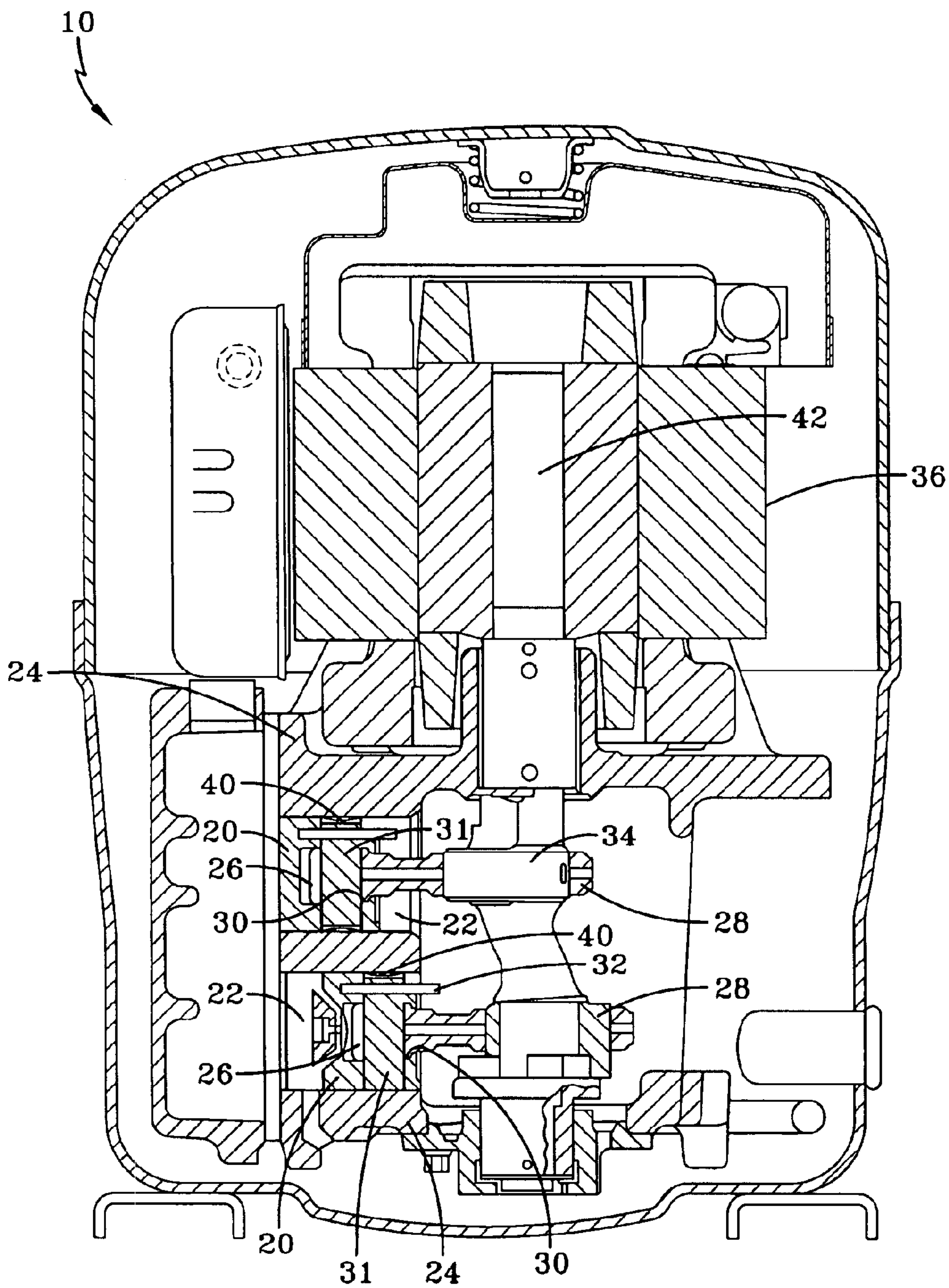
FIG. 1 is a cross sectional view of a reciprocating compressor showing pistons.

The present invention is directed to a die cast aluminum piston for a reciprocating compressor having no aperture cast into the piston for a wrist pin and the subsequent placement of the aperture in a desired location after casting. FIG. 1 is a schematic diagram of a reciprocating compressor 10 having a pair of pistons 20. A piston 20 is positioned within a cylinder 22 of cylinder block 24. A first end of a connecting rod 26 extends into piston cavity 30 in piston 20. The connecting rod is held in place in piston cavity 30 by wrist pin 31. Wrist pin 31 extends into apertures 40 in the piston walls and across piston cavity 30. A second end of connecting rod 28 is attached to a crankshaft 34. Crankshaft 34 rotates when motor 36 is energized. Thus, the rotational motion of the motor causes reciprocating motion of the pistons within cylinder block 24.

Figure 2:
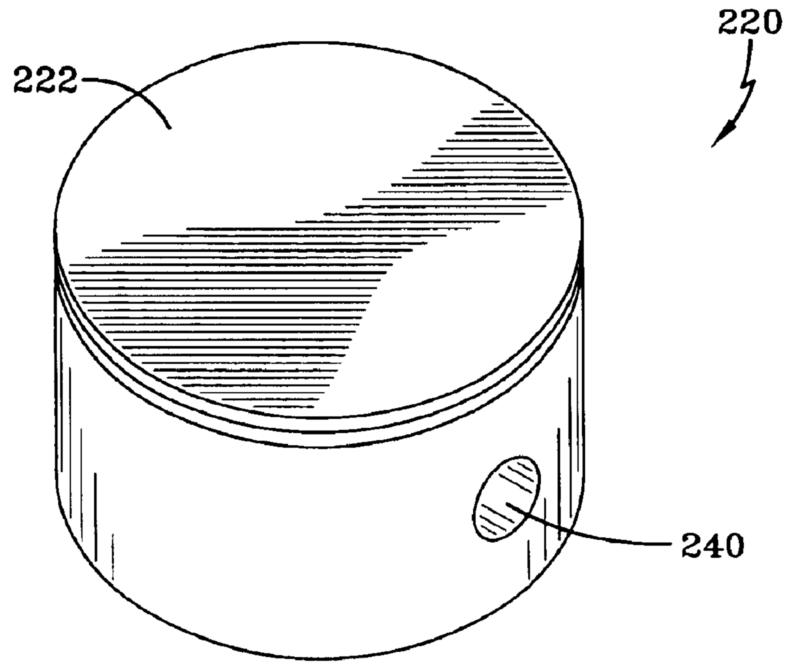
FIG. 2 is a schematic view of a die cast piston made in accordance with prior art processes.

Referring now to FIG. 2, which is a schematic view of a prior art die cast piston 220. This piston 220 includes a piston head 222 and an aperture 240. Aperture 240 extends diametrically across piston 220 and is roughly formed in the piston during the casting process by including a core in the mold. The location of the aperture 240 in piston 220 is determined by the throw height on the crankshaft and the length of the rod. If it is desired to change the stroke of the piston, without changing the rod length, a piston head having aperture 240 located at a different axial position must be cast.

Figure 3:
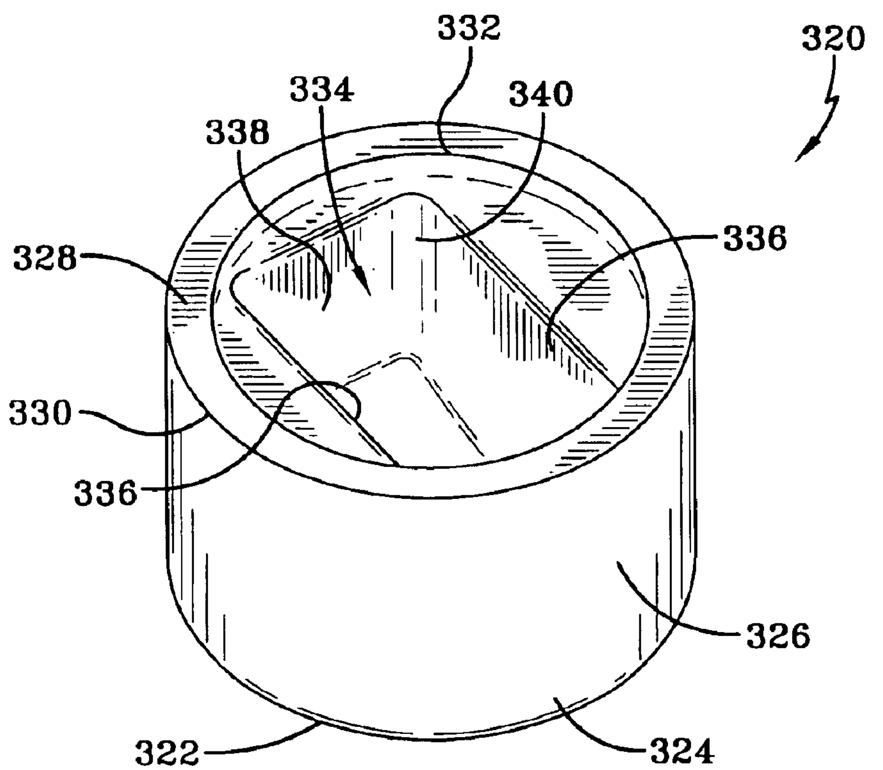
FIG. 3 is a schematic of the piston of the present invention.

In contrast, FIG. 3 illustrates schematically piston 320 of the present invention. Piston 320 is comprised of aluminum or its alloys. Because the piston is die cast, aluminum alloys such as A380, A383, A390 and A356 are preferred, but any castable aluminum alloy may be used.

The as-cast piston 320 has a head 322 at a first end 324 of the piston. A cylindrical body 326 extends away from head 322 to a second end 328 of the piston. Cylindrical body 326 has a preselected outer diameter 330 and a preselected inner geometry 332. The difference between outer diameter 330 and inner geometry 332 at any location is the thickness of the shell forming cylindrical body 326. Second end 328 of piston is substantially open, and inner geometry 332 defines a cavity 334 extending toward head 322. Inner geometry 332 of cylindrical body 326 defines a cavity within the piston. The thickness of the shell is thus predetermined based on the outer diameter 330 size and inner geometry 332 size. The selection of the piston outer diameter 330, inner geometry 332 and thickness is dependent on a number of factors such as the capacity required of the compressor, the size of a connecting rod, the stresses that will be experienced by the piston during operation, etc. Thus, these dimensions can be varied as required. Even though these dimensions may be varied for a particular design, the variation of these dimensions does not affect the principles and operation of the present invention. What is significant about the die cast piston of the present invention is that the shell or cylindrical body 326 of the piston, in the as-cast condition, does not include apertures 40 for the wrist pin 31. The wrist pin 31 secures a connecting rod 26 to piston 320.

As-cast piston 320 further includes a first pair of as-cast substantially parallel walls 336 which extend across inner geometry 332. The walls extend as chords across an inner diameter to provide the cavity with a geometry which has a cross section that is not circular. The walls lie substantially within cavity 334. A second set of as-cast substantially parallel walls 338, only one of which is shown in FIG. 3, also extend as chords across inner geometry 332, lying substantially within cavity 334 and forming substantially right angles with walls 336. As shown in FIG. 3, the walls form a rectangular geometry with chamfers 320 in the corners. This rectangular geometry within the cavity conforms to the geometry of a first end of connecting rod 26 which is inserted into cavity 334. Thus, the geometric configuration within cavity 334 is preselected based upon the geometry of the first end of connecting rod 26. This geometry can change depending upon the configuration of the first end of the connecting rod, and would require the casting to conform to the connecting rod configuration. However, in the preferred embodiment, the geometry is substantially rectangular.

Because the piston is cast without apertures, and therefore without cores extending through the shell, the shell solidification pattern is different. The shell solidification can occur as heat is withdrawn through the mold walls, and the shell can be fed from the thicker sections of the casting, which will typically be the last to solidify and which can be fed by risers to minimize typical casting defects which occur during solidification. This is in contrast to the solidification pattern that occurs when cores are present, as the cores prevent the thicker sections of the casting from being satisfactorily fed, causing porosity in these areas. In order to secure connecting rods 26, it is necessary to form holes in pistons 320. This is accomplished by machining apertures, such as apertures 40, by any convenient process such as by machine drilling or laser drilling. These apertures may be drilled at any convenient location, provided that the apertures are diametrally opposed so that a wrist pin 31 can be inserted through the drilled apertures in piston 320 and through an aperture in connecting rod 26, thereby capturing connecting rod 26. The apertures are drilled in the shell, which is expected to have fewer defects due to the improved solidification patterns, and therefore should be free of defects for a sufficient distance, a few thousands of an inch, away from the surface of aperture 240. Preferably, the apertures are drilled in the shell so as to be perpendicular to the longer pair of parallel walls 336.

In a preferred embodiment, the length of the piston from the first end to the second end is about 1.4 inches. The inner diameter is about 1 inch, while the outer diameter is about 2.0 inches and the depth of the cavity is about 1 inch. The diameter of the aperture is sufficiently large to accept the wrist pin. In the preferred embodiment, this diameter is about 0.625 inches. However, unlike the prior art pistons such as shown in FIG. 2, which required several castings having the apertures located at different positions axially along the shell to provide different strokes and different capacities for different applications, the present invention can utilize the same die casting for different applications, since the die casting includes no prelocated apertures, the apertures being drilled into the die casting at preselected positions as required by the specific application. The apertures formed in the cast piston are not restricted to the diameter of 0.625 inches of the preferred embodiment, but may be formed to any predetermined size. The size of the apertures are determined based upon the size of the wrist pin (which in turn is sized to match the connecting rod hole) used in conjunction with the piston in a compressor application, larger diameter apertures being used with larger diameter wrist pins and smaller diameter apertures used with smaller diameter wrist pins. The apertures are formed to allow the wrist pins to rotate upon assembly into the piston. The diameter of the apertures is ideally slightly larger (typically about 0.002–0.012 inches) than the diameter of the wrist pin, with the same geometric tolerancing. Excessive play of the wrist pin in the aperture during operation is to be avoided.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A piston for a reciprocating compressor, comprising:

a die cast aluminum body having a head at a first end and a cylindrical contour forming an exterior boundary extending away from the head to an opposed second end, the body having a preselected outer diameter, a preselected inner geometry and a preselected thickness so as to form a cavity within the body having walls for receiving a rod, the head, the outer diameter and the inner geometry of the body forming a continuous wall, the cavity having an opening adjacent to the opposed second end of the body, the piston further characterized by an absence of apertures formed by coring extending diametrally through the walls;

the walls having a preselected geometry forming an interior boundary of the body within the cavity;

the piston capable of receiving at least one aperture extending diametrally across and through the outer diameter of the piston at a preselected location between the first end and the second end, the aperture having a preselected diameter corresponding to an outer diameter of a pin; and wherein the walls having a preselected geometry include a first pair of substantially parallel walls extending as chords across the cavity; and a second pair of substantially parallel walls, the second pair of walls extending as chords across the cavity substantially at about 90° to the first pair of walls, the first and second pair of walls forming a substantially rectangular geometry within the cavity of the piston.

2. The piston of claim 1 further including a machined aperture extending diametrally across and through the outer diameter of the piston at a preselected location between the first end and the second end.

3. The piston of claim 1 wherein the walls having a preselected geometry include a geometry preselected to accept a predetermined geometry of a first end of a connecting rod.

4. A method for producing a die cast aluminum alloy piston for a reciprocating compressor comprising the steps of:

casting an aluminum piston having a head at a first end and a cylindrical body extending away from the head to a second end opposed to the head, the body having a preselected outer diameter, a preselected inner geometry and a preselected thickness so as to form a shell, the head and the inner geometry of the cylindrical body defining a cavity opening to the second end opposed to the head, the cast piston further characterized by an absence of a core-formed aperture extending diametrally through the shell, a first pair of parallel rectangular walls extending as chords across the cavity and a second pair of parallel rectangular walls extending as chords across the cavity substantially at about 90° to the first pair of rectangular walls, the first and second pair of rectangular walls forming a substantially rectangular geometry within the cavity; then forming at least one aperture extending diametrally across and through the shell of the cast piston at a preselected location between the first end and the second end, the aperture having a preselected diameter corresponding to an outer diameter of a pin so as to receive the pin.

5. The method of claim 4 further including forming a pair of apertures substantially at right angles to one of the pair of rectangular walls.

6. The method of claim 5 wherein the apertures are formed substantially at right angles to the longer pair of rectangular walls.

7. The method of claim 6 wherein the step of forming the aperture after casting the piston includes machining the aperture diametrally through the walls at a preselected location between the first end and the second end.

8. The method of claim 6 wherein the step of forming the aperture after casting the piston further includes forming apertures of preselected diameter so as to receive the pin.

9. The method of claim 4 wherein the step of casting an aluminum piston further includes an aluminum alloy selected from the group consisting of Al-A380, Al-A383, Al-A390 and Al-A356.

* * * * *